US012698892B2

(12) United States Patent
Xiao et al.

(10) Patent No.: US 12,698,892 B2
(45) Date of Patent: Aug. 4, 2026

(54) ADJUSTABLE LIGHTING DEVICE

(71) Applicant: SAVANT TECHNOLOGIES LLC, East Cleveland, OH (US)

(72) Inventors: Kun Xiao, Shanghai (CN); Jie Gao, Shanghai (CN); Hai Huang, Shanghai (CN); Bin Li, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 19/264,299

(22) Filed: Jul. 9, 2025

(65) Prior Publication Data

US 2026/0132915 A1 May 14, 2026

(30) Foreign Application Priority Data

Jul. 26, 2024 (CN) ......................... 202421795092.2

(51) Int. Cl.

| | |
|---|---|
| ***F21V 23/04*** | (2006.01) |
| ***F21V 15/01*** | (2006.01) |
| ***F21V 23/00*** | (2015.01) |
| ***F21Y 105/18*** | (2016.01) |
| ***H05B 45/10*** | (2020.01) |
| ***H05B 45/20*** | (2020.01) |
| ***H05B 47/155*** | (2020.01) |

(52) U.S. Cl.

CPC .............. *F21V 23/04* (2013.01); *F21V 15/01* (2013.01); *F21V 23/005* (2013.01); *F21V 23/009* (2013.01); *H05B 45/10* (2020.01); *H05B 45/20* (2020.01); *H05B 47/155* (2020.01); *F21Y 2105/18* (2016.08)

(58) Field of Classification Search

CPC ........ F21V 23/04; F21V 15/01; F21V 23/005; F21V 23/009; H05B 45/20; H05B 47/155

See application file for complete search history.

(56) References Cited

U.S. PATENT DOCUMENTS

| | | | | |
|---|---|---|---|---|
| 9,803,846 B2 * | 10/2017 | Chung | .................... | F21V 29/50 |
| 11,248,753 B1 * | 2/2022 | Li | ........................... | F21K 9/232 |

(Continued)

FOREIGN PATENT DOCUMENTS

| | | |
|---|---|---|
| CN | 213299646 U | 5/2021 |
| CN | 220038384 U | 11/2023 |

*Primary Examiner* — Bryon T Gyllstrom

(74) *Attorney, Agent, or Firm* — Wood IP LLC; Theodore A. Wood

(57) ABSTRACT

Provided is an adjustable lighting device that includes a housing, a circuit board provided in the housing, and the circuit board has first circuit terminals and second circuit terminals, light-emitting units, connected to the circuit board, switch terminals arranged on the circuit board for controlling the turning on and turning off of the plurality of light-emitting units, and a sliding rod being slidingly mounted on the housing and contacting with the switch terminals, the second circuit terminals are respectively connected to the light-emitting units, and when the sliding rod contacts and interacts with one of the switch terminals, the switch terminal selectively connects the first circuit terminals to the second circuit terminals, respectively, to control at least some light-emitting units to be turned on or off, to change the turning-on states of the light-emitting units, thereby adjusting lighting parameters of the lighting device.

20 Claims, 7 Drawing Sheets

(56) References Cited

U.S. PATENT DOCUMENTS

| | | | | |
|---|---|---|---|---|
| 11,326,766 | B2 * | 5/2022 | Li | F21K 9/235 |
| 12,352,393 | B2 * | 7/2025 | Xu | F21V 31/00 |
| 2011/0163668 | A1 * | 7/2011 | Jonsson | H05B 47/19 315/129 |
| 2015/0061497 | A1 * | 3/2015 | Martins | H05B 45/10 315/291 |
| 2020/0187319 | A1 * | 6/2020 | Jiang | F21V 23/006 |
| 2021/0088210 | A1 * | 3/2021 | Purdy | F21V 33/0084 |
| 2021/0120644 | A1 * | 4/2021 | Halliwell | F21V 23/04 |
| 2025/0305664 | A1 * | 10/2025 | Fan | F21V 3/00 |
| 2025/0305666 | A1 * | 10/2025 | Liu | F21V 23/002 |

* cited by examiner

ADJUSTABLE LIGHTING DEVICE

CROSS-REFERENCE TO RELATED APPLICATIONS

This application claims priority to Chinese Patent Application Serial Number 2024217950922, filed Jul. 26, 2024, which is herein incorporated by reference.

TECHNICAL FIELD

The present application relates to an adjustable lighting device, which has adjustable lighting parameters, such as brightness and color temperature.

BACKGROUND

In the prior art, the color temperature or brightness level of lighting devices (e.g. LED light fixtures) is changed by SMT (surface mounting technology) or DIP (dual in-line package) switch modules on a printed circuit board (PCB). The size of such a switch module is at least 10 millimeters long; and as the size of the switch module is large, the space of assemblies on the PCB is limited. In addition, the cost of the switch module is high, which leads to high cost of the lighting device.

SUMMARY OF THE INVENTION

In view of this, the present application provides an adjustable lighting device, which has switch terminals of small size; in which by means of cooperation between the switch terminals and a sliding rod, lighting parameters are adjusted, and the defects that the size of the switch module is large and the space on a PCB is limited are overcome.

The lighting device according to the present application comprises: a housing, wherein a circuit board is provided in the housing, and the circuit board has one or more first circuit terminals and a plurality of second circuit terminals; a plurality of light-emitting units, the plurality of light-emitting units being connected to the circuit board; switch terminals, wherein the switch terminals are arranged on the circuit board and are used for controlling the turning on and turning off of the plurality of light-emitting units; and a sliding rod, the sliding rod being slidingly mounted on the housing and being capable of contacting with the switch terminals; wherein the second circuit terminals are respectively connected to the one or more light-emitting units, and when the sliding rod contacts and interacts with one of the switch terminals, the switch terminal selectively connects the one or more first circuit terminals to one or more of the second circuit terminals, respectively, so as to control at least some light-emitting units of the plurality of light-emitting units to be turned on or off, so as to change the turning-on states of the plurality of light-emitting units, thereby adjusting lighting parameters of the lighting device.

In the lighting device, by means of the cooperation between the sliding rod and the switch terminals, at least some light-emitting units of the plurality of light-emitting units can be turned on or turned off, so as to change the number of turned-on or turned-off light-emitting units or the total power, thereby being able to adjust lighting parameters of the lighting device; and the size of the switch terminals is relatively small, such that the space on a PCB is abundant, and the cost of the lighting device is reduced.

According to an embodiment of the present application, the switch terminal has an arched shape; in the process in which the sliding rod contacts and interacts with the switch terminal, the sliding rod presses the switch terminal downwards, such that the switch terminal is engaged with and connected to a circuit of the light-emitting units.

In an initial state, the switch terminal having an arched shape keeps disconnected from the circuit of the light-emitting units, and the sliding rod presses the switch terminal downwards to connect the circuit of the light-emitting units. After the sliding rod slides to be disengaged from the switch terminal, the switch terminal can rebound automatically, thereby disconnecting the circuit of the light-emitting units. Such a structure is simple, easy to operate, and has low cost.

Further, at the vertex of the arch shape of the switch terminal, the lower surface of the switch terminal has a first protruding portion extending downward to be engaged with the circuit of the light-emitting units.

The lower surface of the switch terminal is provided with a first protruding portion extending downward to be engaged with the circuit of the light-emitting units.

Further, the sliding rod comprises: a handle, provided at an outer side of the housing and configured to enable the sliding rod to slide in an opening of the housing under the pushing of a user; a snap-fit portion, arranged on the side of the handle facing the housing and cooperating with the opening to hold the sliding rod on the housing; and an actuating rod, extending from the handle into the housing, and pressing the switch terminal when the actuating rod slides to the switch terminal.

The sliding rod has a simple structure and can easily press the switch terminal downward.

Further, the lower surface of the actuating rod has bosses for abutting against the switch terminal.

Further, at the vertex of the arch shape of the switch terminal, the upper surface of the switch terminal has a recess for receiving the boss.

According to another embodiment of the present application, in the initial state, the switch terminal is engaged with and connected to the circuit of the light-emitting units, such that the plurality of light-emitting units are in a turned-on state; and in a process in which the sliding rod contacts and interacts with the switch terminal, the sliding rod is inserted between the switch terminal and the circuit of the light-emitting units, so as to disconnect the circuit of some light-emitting units.

Further, the switch terminal comprises: a support portion, one end of the support portion being mounted to the circuit board; a connecting portion, wherein one end of the connecting portion is connected to the other end of the support portion, and the connecting portion extends downwards at an angle relative to the support portion; and a contact portion, the contact portion extending from the other end of the connecting portion and being parallel to the circuit board; wherein in the initial state, the contact portion is engaged with and connected to the circuit of the light-emitting units.

Further, the lower surface of the contact portion has a second protruding portion extending downward to be engaged with the circuit of the light-emitting units.

Further, the sliding rod comprises: a handle, provided at an outer side of the housing and configured to enable the sliding rod to slide in an opening of the housing under the pushing of a user; a snap-fit portion, arranged on the side of the handle facing the housing and cooperating with the opening to hold the sliding rod on the housing; and an actuating rod, extending from the handle into the housing, and when the actuating rod slides to the switch terminal, the actuating rod being inserted between the switch terminal and the circuit of the light-emitting units so as to disconnect the circuit of some light-emitting units.

Further, the upper surface of the actuating rod has a groove for receiving the second protruding portion of the contact portion.

In this embodiment, in the initial state, the switch terminal keeps connected to the circuit of the light-emitting units, and the sliding rod slides to be inserted between the switch terminal and the circuit of the light-emitting units so as to disconnect the circuit of the light-emitting units. After the sliding rod slides to be disengaged from the switch terminal, the switch terminal can rebound automatically, thereby connecting the circuit of the light-emitting units. Such a structure is simple, easy to operate, and has low cost.

According to another embodiment of the present application, the sliding rod pushes the switch terminal, such that the switch terminal is engaged with and connected to the circuit of at least some light-emitting units of the plurality of light-emitting units, to turn on some light-emitting units.

Further, a first end of the switch terminal is rotatably fixed to the circuit board, such that during the rotation of the switch terminal, a second end of the switch terminal can be sequentially engaged with the circuit of at least some light-emitting units.

Further, the switch terminal comprises: a first support portion arranged at the first end of the switch terminal, the first support portion being rotatably fixed to the circuit board; a second support portion, arranged at the second end of the switch terminal, the second support portion being capable of sequentially engaging with the circuit of at least some light-emitting units during rotation; and an intermediate connecting portion, connecting the first support portion and the second support portion, the intermediate connecting portion being spaced apart from the circuit board.

Further, the lower surface of the first support portion is provided with a first protrusion so as to be engaged with the first circuit terminal on the circuit board; and the lower surface of the second support portion is provided with a second protrusion so as to be selectively engaged with the second circuit terminal on the circuit board.

Further, the sliding rod cooperates with the intermediate connecting portion of the switch terminal so as to push the switch terminal.

In this embodiment, the sliding rod pushes the switch terminals, the switch terminal selectively connects the first circuit terminals to one of the plurality of second circuit terminals, so as to control the turning-on states of the plurality of light-emitting units, thereby adjusting lighting parameters of the lighting device.

Further, the lighting device comprises a plurality of switch terminals, and the sliding rod selectively contacts and interacts with different switch terminals so as to selectively connect the first circuit terminals to one of the plurality of second circuit terminals through the corresponding switch terminal.

Further, the lighting parameters comprise brightness and color temperature.

Further, adjusting the lighting parameters of the lighting device comprises adjusting the brightness, and changing the turning-on states of the plurality of light-emitting units comprises changing the number of turned-on light-emitting units or the turning-on power.

Further, adjusting the lighting parameters of the lighting device further comprises adjusting the color temperature; the plurality of light-emitting units comprise first-group light-emitting units having a first color temperature and second-group light-emitting units having a second color temperature; and changing the turning-on states of the plurality of light-emitting units comprises changing the turning-on state of at least one group of the first-group light-emitting units and the second-group light-emitting units.

BRIEF DESCRIPTION OF THE DRAWINGS

The drawings accompanying the description and constituting a part of the present application are used for providing further understanding of the present application, and the illustrative embodiments of the present application and illustrations thereof are used to explain the present application, rather than constitute inappropriate limitation on the present application. In the drawings.

DETAILED DESCRIPTION

Figure 1:
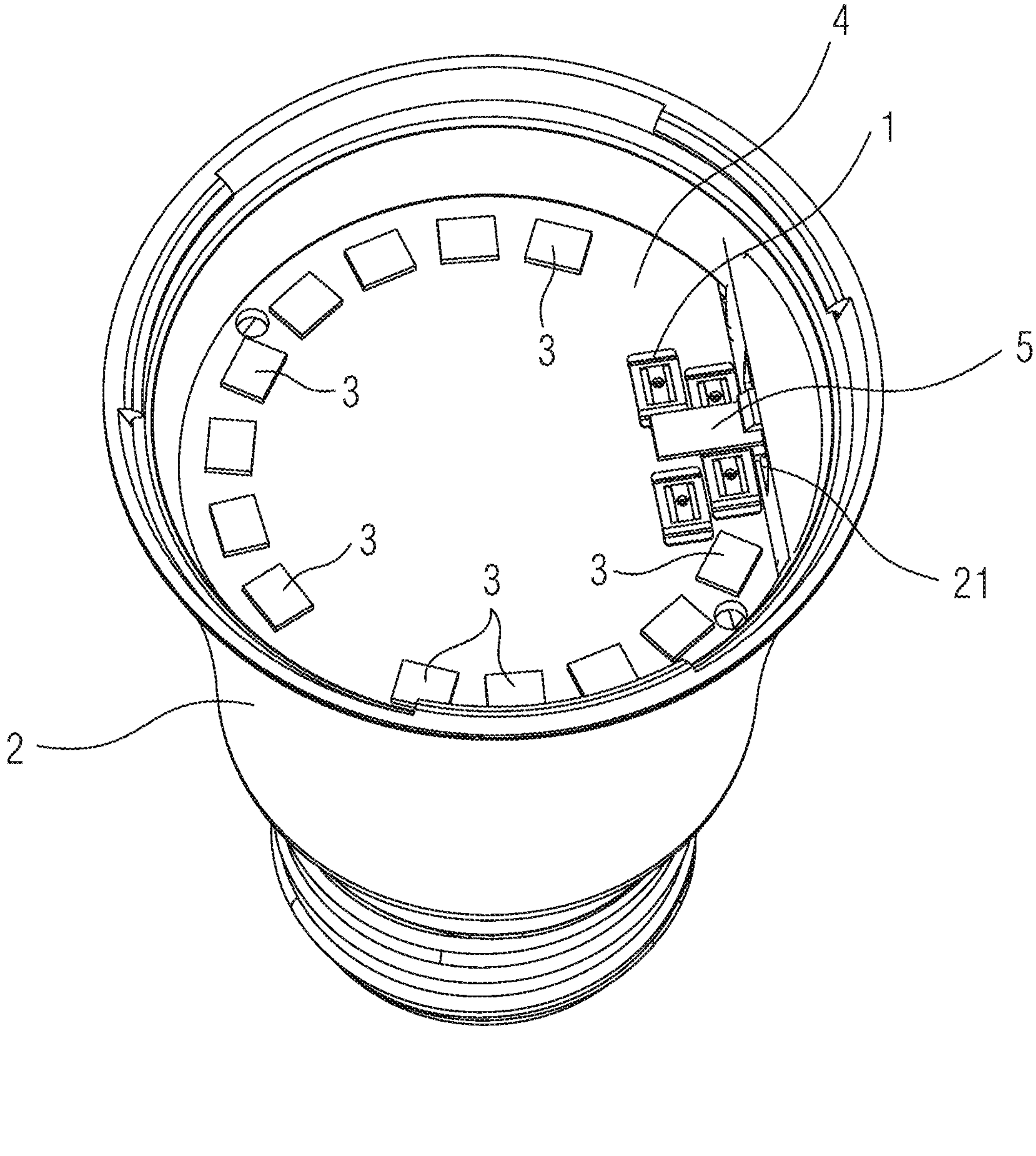
FIG. 1 is a perspective view of a lighting device according to an embodiment of the present application.

To make the objects, technical solutions and advantages of the present application clearer, hereinafter, the present application is further described in detail by taking embodiments as examples.

It should be noted that the embodiments in the present application and features in the embodiments can be combined with each other without conflicts. Hereinafter, the present application will be described in detail with reference to the accompanying drawings and in conjunction with the embodiments.

An adjustable lighting device according to the present application comprises: a housing 2, wherein a circuit board 4 is provided in the housing 2, and the circuit board 4 has one or more first circuit terminals and a plurality of second circuit terminals; a plurality of light-emitting units 3, the plurality of light-emitting units 3 being connected to the circuit board 4; switch terminals 1, wherein the switch terminals 1 are arranged in the circuit board 4 and are used for controlling the turning on and turning off of the plurality of light-emitting units 3; and a sliding rod 5, the sliding rod 5 being slidingly mounted on the housing 2 and being capable of contacting with the switch terminals 1. The second circuit terminals are respectively connected to the one or more light-emitting units 3, and when the sliding rod 5 contacts and interacts with one of the switch terminals 1, the switch terminal 1 selectively connects one or more first circuit terminals to one or more of the plurality of second circuit terminals, respectively, so as to control at least some light-emitting units of the plurality of light-emitting units 3 to be turned on or off, so as to change the turning-on states of the plurality of light-emitting units 3, thereby adjusting the lighting parameters of the lighting device. The lighting parameters comprise brightness and color temperature.

Figure 4:
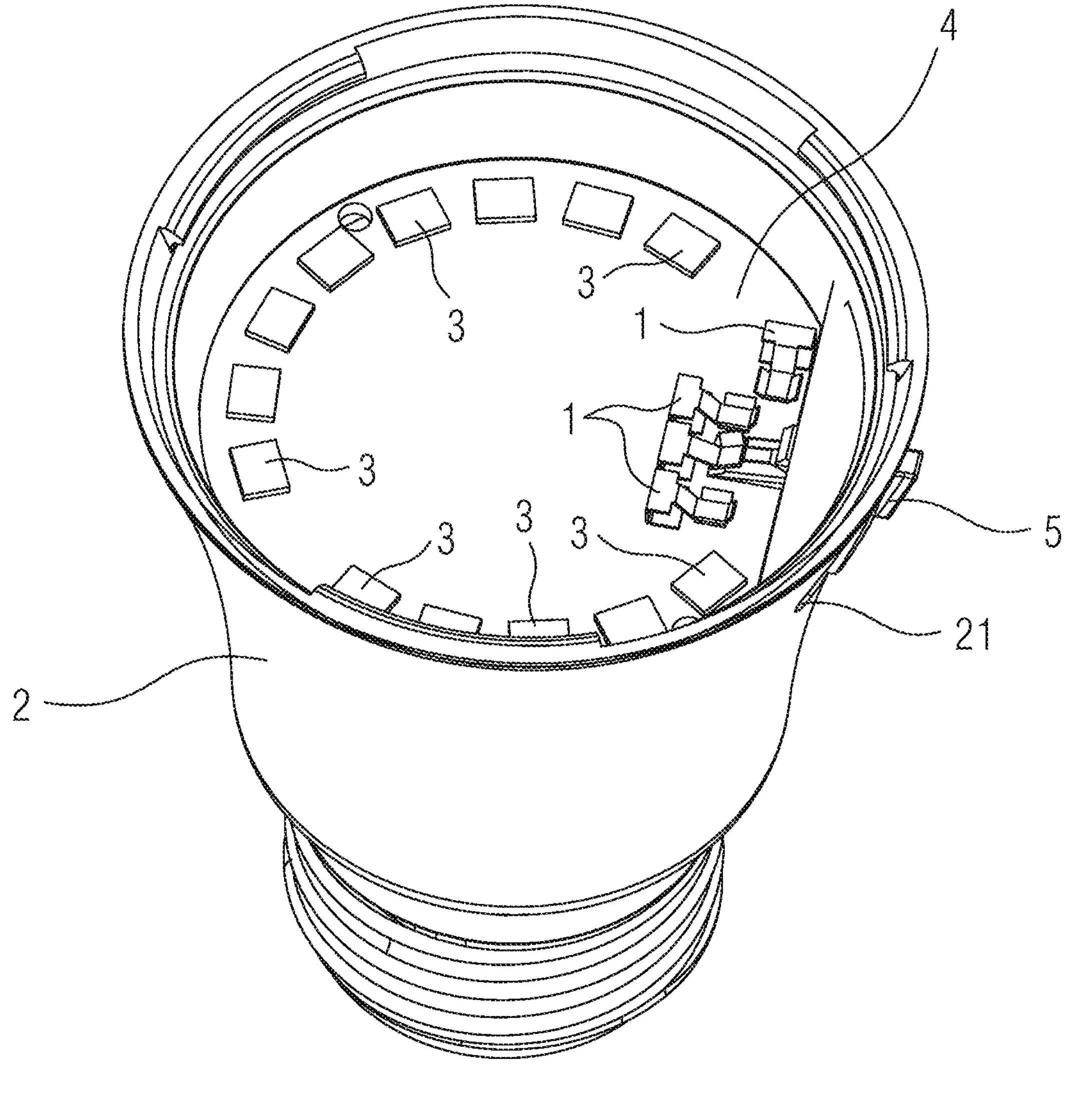
FIG. 4 is a perspective view of a lighting device according to another embodiment of the present application.

Specifically, as shown in FIGS. 1 and 4, the lighting device comprises a plurality of switch terminals 1, and the sliding rod 5 selectively contacts and interacts with different switch terminals so as to selectively connect the first circuit terminals to one of the plurality of second circuit terminals through the corresponding switch terminal.

The first circuit terminals are components of a first circuit (for example, a power supply circuit), and the second circuit terminals are components of a second circuit (for example, a light-emitting unit circuit). If the first circuit terminals are connected to the second circuit terminals through the switch terminals 1, the first circuit and the second circuit form a loop, and the light-emitting units are in a turned-on state. If the first circuit terminals are disconnected from the second circuit terminals through the switch terminals 1, the first circuit and the second circuit are disconnected, and the light-emitting units are in a turned-off state.

Adjusting the lighting parameters of the lighting device comprises adjusting the brightness, and changing the turning-on states of the plurality of light-emitting units 3 comprises changing the number of turned-on light-emitting units or the turning-on power.

Hereinafter, how to adjust the brightness of the lighting device, that is, how to adjust the lumen of the lighting device will be described by examples.

For example, a first switch terminal of the switch terminals 1 is connected to a first-group light-emitting unit circuit, the first-group light-emitting unit circuit having three light-emitting units. A second switch terminal of the switch terminals 1 is connected to a second-group light-emitting unit circuit, the second-group light-emitting unit circuit having five light-emitting units.

When the sliding rod 5 is engaged with the first switch terminal, the first switch terminal enables the first-group light-emitting unit circuit to be connected to the power supply circuit, and then the three light-emitting units are turned on.

When the sliding rod 5 is disengaged from the first switch terminal, the first-group light-emitting unit circuit is disconnected from the power supply circuit, and the three light-emitting units in the first-group light-emitting unit circuit are turned off.

When the sliding rod 5 slides to cooperate with the second switch terminal, the second switch terminal enables the second-group light-emitting unit circuit to be connected to the power supply circuit, then the five light-emitting units are turned on, and the brightness thereof is different from that of the three light-emitting units.

Therefore, by sliding the sliding rod 5, the sliding rod 5 is connected to different switch terminals, such that different light-emitting unit circuits are connected to or disconnected from the power supply circuit, thereby changing the number of turned-on light-emitting units, and further changing the brightness of the lighting device.

Similarly to changing the number of turned-on light-emitting units, the brightness of the lighting device can also be changed by changing the power of the turned-on light-emitting units.

Adjusting the lighting parameters of the lighting device further comprises adjusting the color temperature. The plurality of light-emitting units comprise first-group light-emitting units having a first color temperature and second-group light-emitting units having a second color temperature; and changing the turning-on states of the plurality of light-emitting units 3 comprises changing the turning-on state of at least one group of the first-group light-emitting units and the second-group light-emitting units.

Hereinafter, how to adjust the color temperature of the lighting device will be described by examples.

For example, the first switch terminal of the switch terminals 1 is connected to the first-group light-emitting unit circuit, and the first-group light-emitting units of the first-group light-emitting unit circuit have the first color temperature. The second switch terminal of the switch terminals 1 is connected to the second-group light-emitting unit circuit, and the second-group light-emitting units of the second-group light-emitting unit circuit have the second color temperature.

When the sliding rod 5 is engaged with the first switch terminal, the first switch terminal enables the first-group light-emitting unit circuit to be connected to the power supply circuit, and then the first-group light-emitting units are turned on to emit light having the first color temperature.

When the sliding rod 5 is disengaged from the first switch terminal, the first-group light-emitting unit circuit is disconnected from the power supply circuit, and the first-group light-emitting units in the first-group light-emitting unit circuit are turned off.

When the sliding rod 5 slides to cooperate with the second switch terminal, the second switch terminal enables the second-group light-emitting unit circuit to be connected to the power supply circuit, and then the second-group light-emitting units are turned on to emit light having the second color temperature. The second color temperature is different from the first color temperature.

Therefore, by sliding the sliding rod 5, the sliding rod 5 is engaged with different switch terminals, such that the light-emitting unit circuits having different color temperatures are connected to or disconnected from the power supply circuit, thereby realizing the change of the color temperature.

Figure 2:
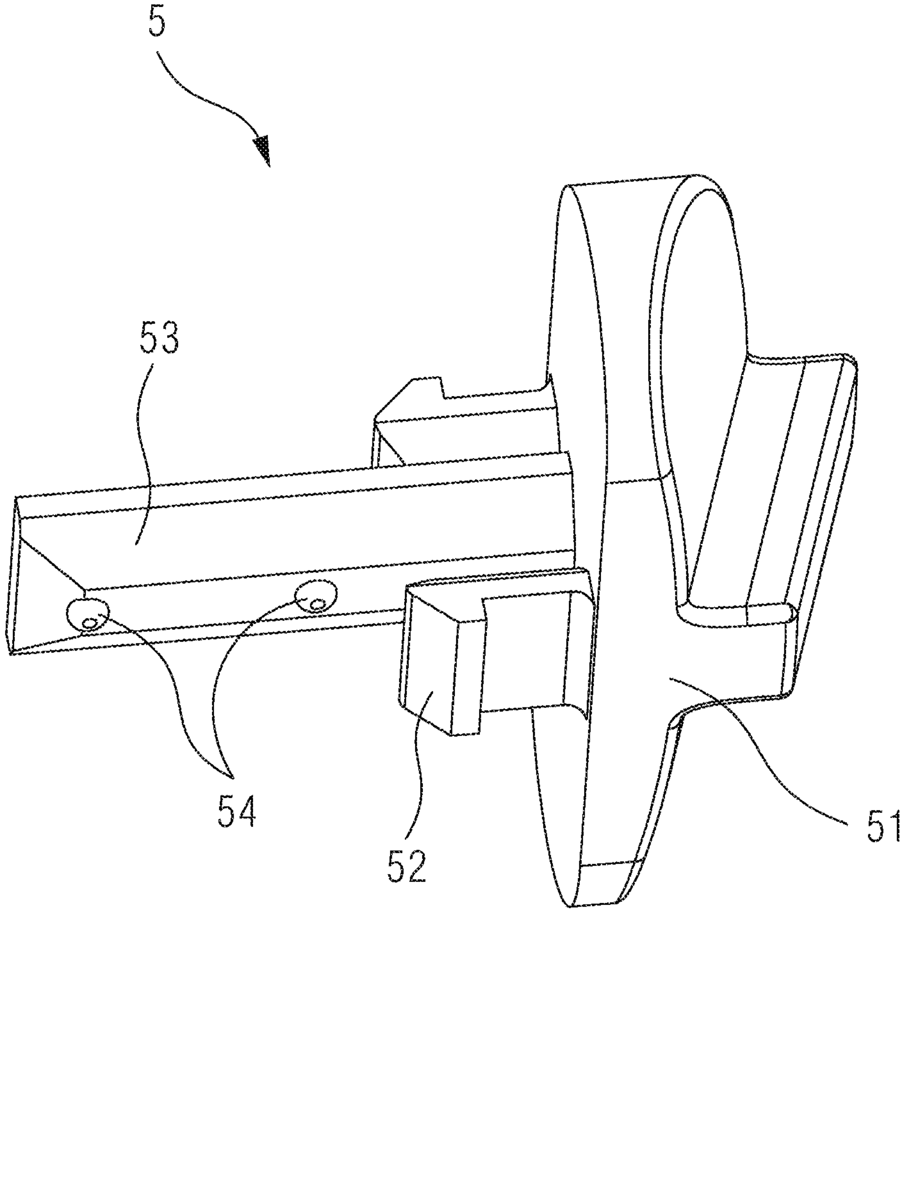
FIG. 2 is a perspective view of a sliding rod in the lighting device of FIG. 1.
Figure 3:
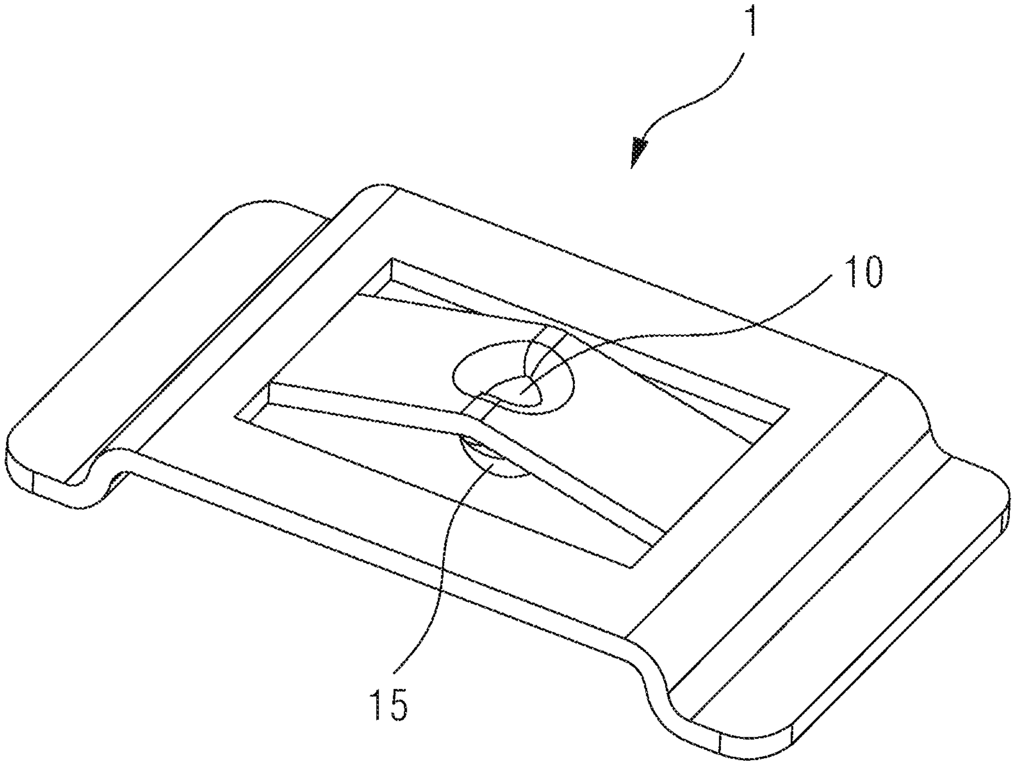
FIG. 3 is a perspective view of a switch terminal in the lighting device of FIG. 1.

FIGS. 1, 2 and 3 illustrate a lighting device according to a first embodiment of the present application.

In this embodiment, as shown in FIG. 3, the switch terminal 1 has an arched shape; in the process in which the sliding rod 5 contacts and interacts with the switch terminal 1, the sliding rod 5 presses the switch terminal 1 downwards, such that the switch terminal 1 is engaged with and connected to the circuit of the light-emitting units 3.

That is to say, the sliding rod 5 presses the switch terminal 1 downwards to enable the light-emitting unit circuit to be connected to the power supply circuit, thereby enabling at least some of the light-emitting units to be turned on.

At the vertex of the arch shape of the switch terminal 1, the lower surface of the switch terminal 1 has a first protruding portion 15 extending downward to be engaged with the circuit of the light-emitting units 3.

As shown in FIG. 2, the sliding rod 5 comprises: a handle 51, provided at an outer side of the housing 2 and configured to enable the sliding rod to slide in an opening 21 of the housing 2 under the pushing of a user; a snap-fit portion 52, arranged on the side of the handle 51 facing the housing 2 and cooperating with the opening 21 to hold the sliding rod 5 on the housing 2; and an actuating rod 53, extending from the handle 51 into the housing 2, and pressing the switch terminal 1 when the actuating rod 53 slides to the switch terminal 1.

The lower surface of the actuating rod 53 has bosses 54 for abutting against the switch terminal 1.

At the vertex of the arch shape of the switch terminal 1, the upper surface of the switch terminal 1 has a recess 10 for receiving the boss 54.

A boss 54 of the actuating rod 53 can slide into the recess 10, and be received in the recess 10. In the process of the recess 10 receiving the boss 54, the user may feel a click or vibration generated by the recess 10 receiving the boss 54, so as to remind the user that the sliding rod 5 has been engaged with the switch terminal 1.

Figure 5:
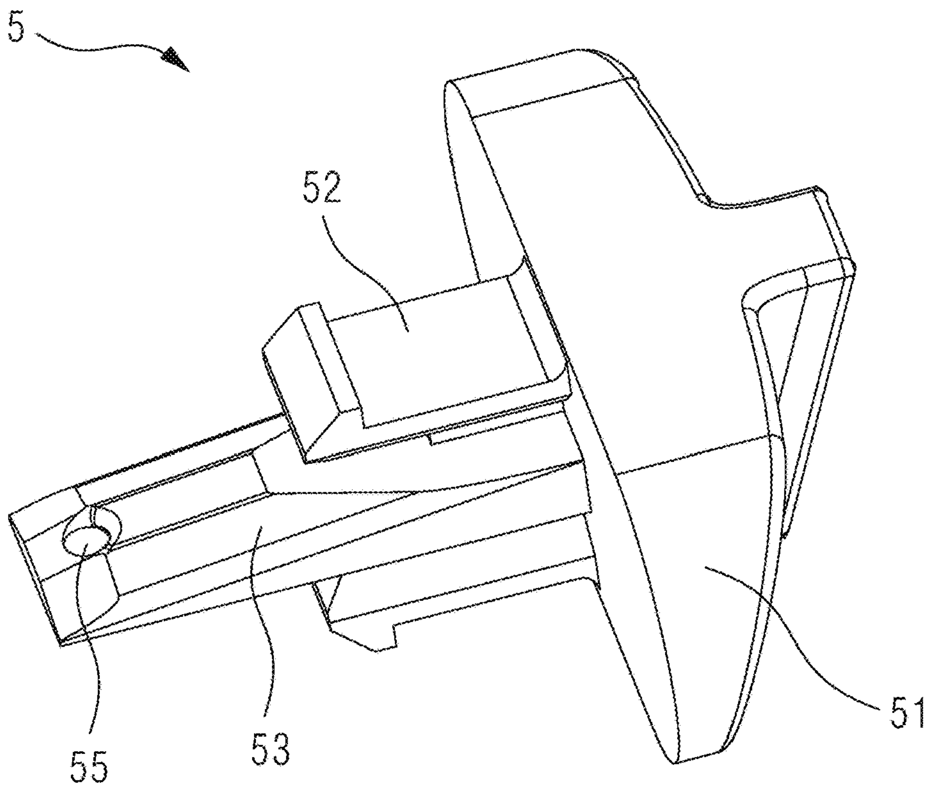
FIG. 5 is a perspective view of a sliding rod in the lighting device of FIG. 4.
Figure 6:
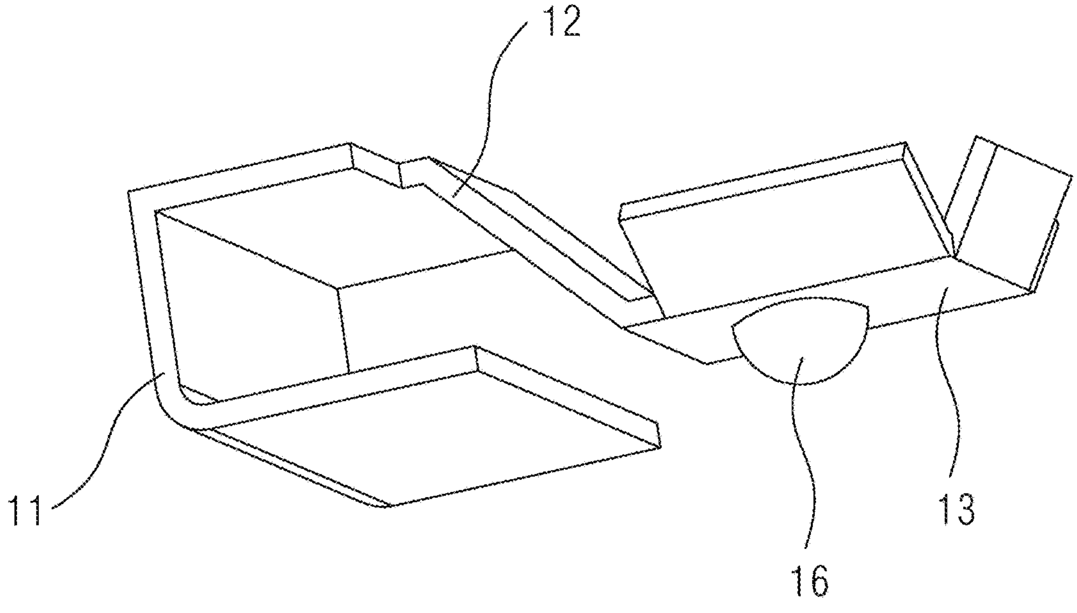
FIG. 6 is a perspective view of a switch terminal in the lighting device of FIG. 4.

FIGS. 4, 5 and 6 illustrate a lighting device according to a second embodiment of the present application.

In this embodiment, in an initial state, the switch terminal 1 is engaged with and connected to the circuit of the light-emitting units 3, such that a plurality of light-emitting units 3 are in a turned-on state; and in a process in which the sliding rod 5 contacts and interacts with the switch terminal 1, the sliding rod 5 is inserted between the switch terminal 1 and the circuit of the light-emitting units 3, so as to disconnect the circuit of some light-emitting units.

As shown in FIG. 6, the switch terminal 1 comprises: a support portion 11, one end of the support portion 11 being mounted to the circuit board 4; a connecting portion 12, wherein one end of the connecting portion 12 is connected to the other end of the support portion 11, and the connecting portion 12 extends downwards at an angle relative to the support portion 11; and a contact portion 13, the contact portion 13 extending from the other end of the connecting portion 12 and being parallel to the circuit board 4; wherein in the initial state, the contact portion 13 is engaged with and connected to the circuit of the light-emitting units.

The lower surface of the contact portion 13 has a second protruding portion 16 extending downward to be engaged with the circuit of the light-emitting units 3.

As shown in FIG. 5, the sliding rod 5 comprises: a handle 51, provided at an outer side of the housing 2 and configured to enable the sliding rod to slide in an opening 21 of the housing 2 under the pushing of a user; a snap-fit portion 52, arranged on the side of the handle 51 facing the housing 2 and cooperating with the opening 21 to hold the sliding rod 5 on the housing 2; and an actuating rod 53, extending from the handle 51 into the housing 2, and when the actuating rod 53 slides to the switch terminal 1, the actuating rod 53 being inserted between the switch terminal 1 and the circuit of the light-emitting units 3 so as to disconnect the circuit of some light-emitting units 3.

The upper surface of the actuating rod 53 has a groove 55 for receiving the second protruding portion 16 of the contact portion 13.

The groove 55 of the actuating rod 53 can slide into the second protruding portion 16, and receive the second protruding portion 16. In the process of the groove 55 receiving the second protruding portion 16, the user may feel that the groove 55 receives a click or vibration generated by the second protruding portion 16, so as to remind the user that the sliding rod 5 has been engaged with the switch terminal 1.

Figure 7:
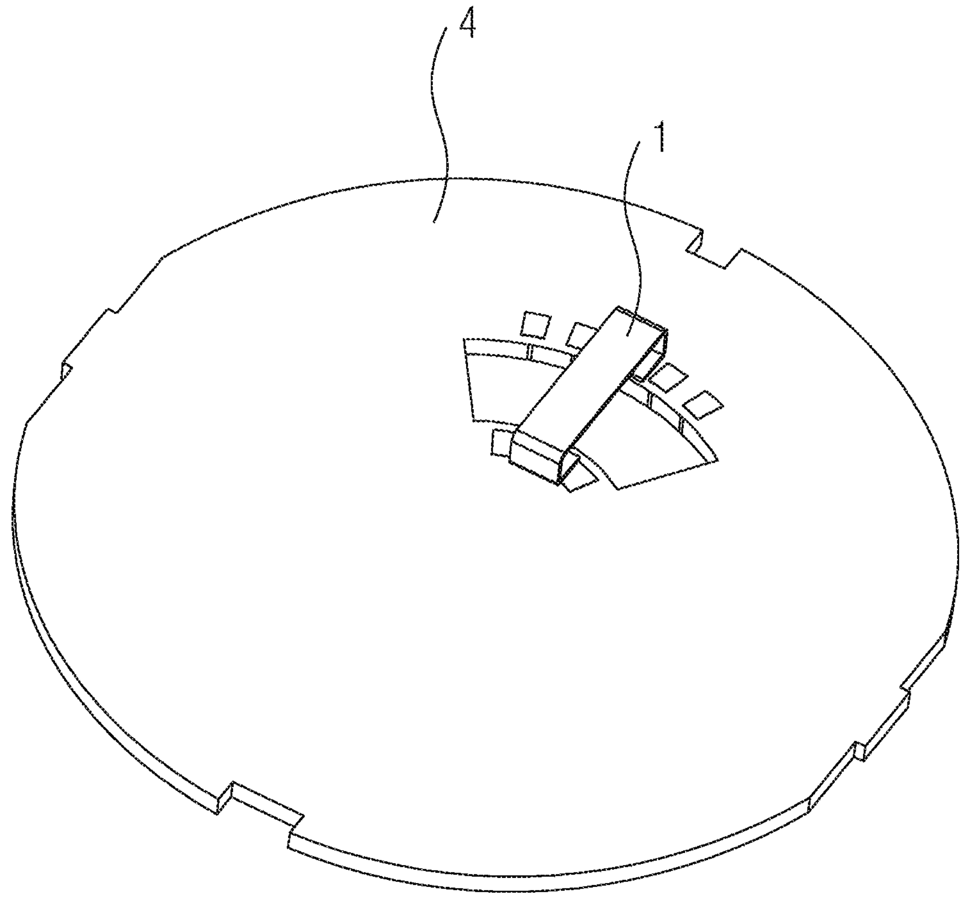
FIG. 7 is a perspective view of a lighting device according to still another embodiment of the present application.
Figure 8:
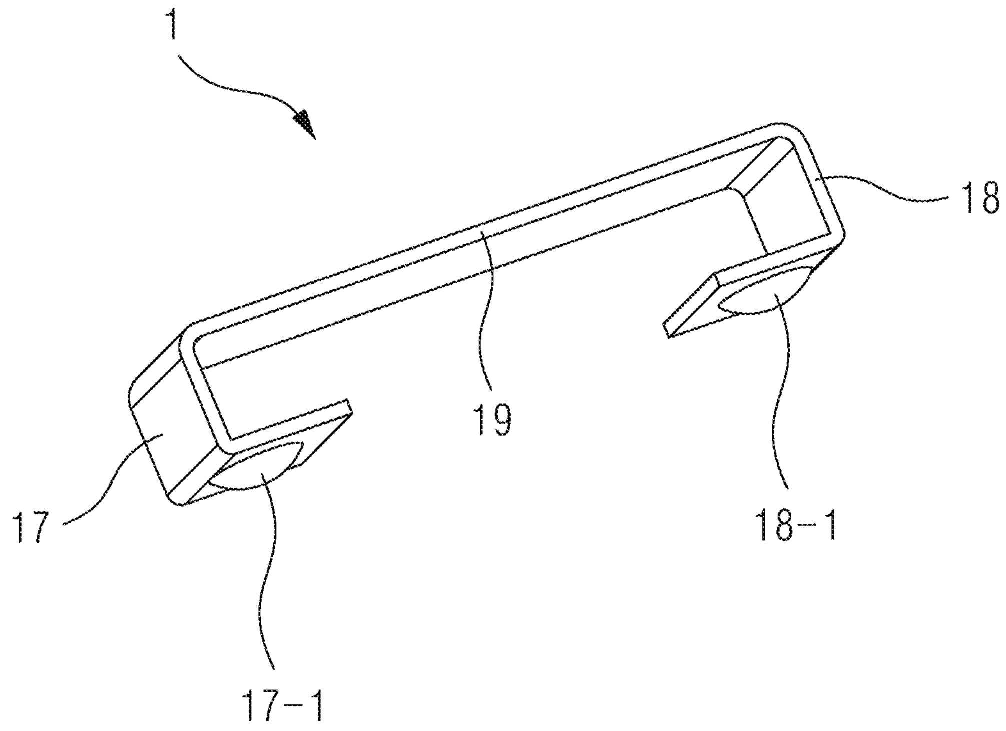
FIG. 8 is a perspective view of a switch terminal in the lighting device of FIG. 7.

FIGS. 7 and 8 illustrate the switch terminal of the lighting device according to the third embodiment of the present application.

As shown in FIG. 7, the sliding rod 5 pushes the switch terminal 1, such that the switch terminal 1 is engaged with and connected to the circuit of at least some light-emitting units of the plurality of light-emitting units 3, to turn on some light-emitting units.

Specifically, a first end of the switch terminal 1 is rotatably fixed to the circuit board 4, such that during the rotation of the switch terminal 1, a second end of the switch terminal 1 can be sequentially engaged with the circuit of at least some light-emitting units.

As shown in FIG. 8, the switch terminal 1 comprises: a first support portion 17 arranged at the first end of the switch terminal 1, the first support portion 17 being rotatably fixed to the circuit board 4; a second support portion 18, arranged at the second end of the switch terminal 1, the second support portion 18 being capable of sequentially engaging with the circuit of at least some light-emitting units during rotation; and an intermediate connecting portion 19, connecting the first support portion 17 and the second support portion 18, the intermediate connecting portion 19 being spaced apart from the circuit board 4.

The lower surface of the first support portion 17 is provided with a first protrusion 17-1 so as to be engaged with the first circuit terminal on the circuit board 4; and the lower surface of the second support portion 18 is provided with a second protrusion 18-1 so as to be selectively engaged with the second circuit terminal on the circuit board 4.

The sliding rod 5 cooperates with the intermediate connecting portion 19 of the switch terminal 1 so as to push the switch terminal 1.

In the present application, the sliding rod 5 is made of an insulating material, for example, a plastic material. When the sliding rod 5 made of the insulating material is engaged with and disengaged from the conductive switch terminal 1, no electric arc is generated between the sliding rod 5 and the switch terminal 1, which can prevent damage to components of the lighting device.

In addition, the handle 51 may be provided with textures, so as to increase a friction force between the fingers of the user and the handle 51.

According to the adjustable lighting device of the present application, the lighting parameters of the lighting device can be adjusted by means of the cooperation between the switch terminals and the sliding rod; and the switch terminals have a small size and facilitate arrangement on the PCB.

The content above merely relates to preferred embodiments of the present application and is not intended to limit the present application. For a person skilled in the art, the present application may have various modifications and variations. Any modifications, equivalent replacements, improvements, etc. made within the spirit and principle of some embodiments of the present disclosure shall all belong to the scope of protection of some embodiments of the present disclosure.

The invention claimed is:

1. An adjustable lighting device, wherein the lighting device comprises:

a housing, wherein a circuit board is provided in the housing, and the circuit board has one or more first circuit terminals and a plurality of second circuit terminals;

a plurality of light-emitting units, the plurality of light-emitting units being connected to the circuit board;

switch terminals, wherein the switch terminals are arranged on the circuit board and are used for controlling the turning on and turning off of the plurality of light-emitting units; and a sliding rod, the sliding rod being slidingly mounted on the housing and being capable of contacting with the switch terminals;

wherein the second circuit terminals are respectively connected to the one or more light-emitting units, and when the sliding rod contacts and interacts with one of the switch terminals, the switch terminal selectively connects the one or more first circuit terminals to one or more of the second circuit terminals, respectively, so as to control at least some light-emitting units of the plurality of light-emitting units to be turned on or off, so as to change the turning-on states of the plurality of light-emitting units, thereby adjusting lighting parameters of the lighting device.

2. The adjustable lighting device according to claim 1, wherein the switch terminal has an arched shape; in the process in which the sliding rod contacts and interacts with the switch terminal, the sliding rod presses the switch terminal downwards, such that the switch terminal is engaged with and connected to a circuit of the light-emitting units.

3. The adjustable lighting device according to claim 2, wherein at the vertex of the arch shape of the switch terminal, the lower surface of the switch terminal has a first protruding portion extending downward to be engaged with the circuit of the light-emitting units.

4. The adjustable lighting device according to claim 3, wherein the sliding rod comprises:

a handle, provided at an outer side of the housing and configured to enable the sliding rod to slide in an opening of the housing under the pushing of a user;

a snap-fit portion, arranged on the side of the handle facing the housing and cooperating with the opening to hold the sliding rod on the housing; and an actuating rod, extending from the handle into the housing, and pressing the switch terminal when the actuating rod slides to the switch terminal.

5. The adjustable lighting device according to claim 4, wherein the lower surface of the actuating rod has bosses for abutting against the switch terminal.

6. The adjustable lighting device according to claim 5, wherein at the vertex of the arch shape of the switch terminal, the upper surface of the switch terminal has a recess for receiving the boss.

7. The adjustable lighting device according to claim 1, wherein in an initial state, the switch terminal is engaged with and connected to the circuit of the light-emitting units, such that the plurality of light-emitting units are in a turned-on state; and in a process in which the sliding rod contacts and interacts with the switch terminal, the sliding rod is inserted between the switch terminal and the circuit of the light-emitting units, so as to disconnect the circuit of some light-emitting units.

8. The adjustable lighting device according to claim 7, wherein the switch terminal comprises:

a support portion, one end of the support portion being mounted to the circuit board;

a connecting portion, wherein one end of the connecting portion is connected to the other end of the support portion, and the connecting portion extends downwards at an angle relative to the support portion; and a contact portion, the contact portion extending from the other end of the connecting portion and being parallel to the circuit board; wherein in the initial state, the contact portion is engaged with and connected to the circuit of the light-emitting units.

9. The adjustable lighting device according to claim 8, wherein the lower surface of the contact portion has a second protruding portion extending downward to be engaged with the circuit of the light-emitting units.

10. The adjustable lighting device according to claim 9, wherein the sliding rod comprises:

a handle, provided at an outer side of the housing and configured to enable the sliding rod to slide in an opening of the housing under the pushing of a user;

a snap-fit portion, arranged on the side of the handle facing the housing and cooperating with the opening to hold the sliding rod on the housing; and an actuating rod, extending from the handle into the housing, and when the actuating rod slides to the switch terminal, the actuating rod being inserted between the switch terminal and the circuit of the light-emitting units so as to disconnect the circuit of some light-emitting units.

11. The adjustable lighting device according to claim 10, wherein the upper surface of the actuating rod has a groove for receiving the second protruding portion of the contact portion.

12. The adjustable lighting device according to claim 1, wherein the sliding rod pushes the switch terminal, such that the switch terminal is engaged with and connected to the circuit of at least some light-emitting units of the plurality of light-emitting units (3), to turn on some light-emitting units.

13. The adjustable lighting device according to claim 12, wherein a first end of the switch terminal is rotatably fixed to the circuit board, such that during the rotation of the switch terminal, a second end of the switch terminal can be sequentially engaged with the circuit of at least some light-emitting units.

14. The adjustable lighting device according to claim 13, wherein the switch terminal comprises:

a first support portion arranged at the first end of the switch terminal, the first support portion being rotatably fixed to the circuit board;

a second support portion, arranged at the second end of the switch terminal, the second support portion being capable of sequentially engaging with the circuit of at least some light-emitting units during rotation; and an intermediate connecting portion, connecting the first support portion and the second support portion, the intermediate connecting portion being spaced apart from the circuit board.

15. The adjustable lighting device according to claim 14, wherein the lower surface of the first support portion is provided with a first protrusion so as to be engaged with the first circuit terminal on the circuit board; and the lower surface of the second support portion is provided with a second protrusion so as to be selectively engaged with the second circuit terminal on the circuit board.

16. The adjustable lighting device according to claim 14, wherein the sliding rod cooperates with the intermediate connecting portion of the switch terminal so as to push the switch terminal.

17. The adjustable lighting device according to claim 1, wherein the lighting device comprises a plurality of switch terminals, and the sliding rod selectively contacts and interacts with different switch terminals so as to selectively connect the first circuit terminals to one of the plurality of second circuit terminals through the corresponding switch terminal.

18. The adjustable lighting device according to claim 1, wherein the lighting parameters comprise brightness and color temperature.

19. The adjustable lighting device according to claim 1, wherein adjusting the lighting parameters of the lighting device comprises adjusting the brightness, and changing the turning-on states of the plurality of light-emitting units comprises changing the number of turned-on light-emitting units or the turning-on power.

20. The adjustable lighting device according to claim 1, wherein adjusting the lighting parameters of the lighting device further comprises adjusting the color temperature; the plurality of light-emitting units comprise first-group light-emitting units having a first color temperature and second-group light-emitting units having a second color temperature; and changing the turning-on states of the plurality of light-emitting units comprises changing the turning-on state of at least one group of the first-group light-emitting units and the second-group light-emitting units.

* * * * *